(12) United States Patent
Al-Khayat et al.

(10) Patent No.: US 11,475,375 B1
(45) Date of Patent: Oct. 18, 2022

(54) RISK ASSESSMENT WITH AUTOMATED ESCALATION OR APPROVAL

(71) Applicant: MORGAN STANLEY SERVICES GROUP INC., New York, NY (US)

(72) Inventors: Muna Al-Khayat, Montreal (CA); Divya Rawat, Dehradun (IN); Sara J. G. Krantz, Scotch Plains, NJ (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 17/728,590

(22) Filed: Apr. 25, 2022

(51) Int. Cl.
 *G06N 20/20* (2019.01)
 *G06K 9/62* (2022.01)
 *G06N 5/00* (2006.01)

(52) U.S. Cl.
 CPC ............. *G06N 20/20* (2019.01); *G06K 9/628* (2013.01); *G06N 5/003* (2013.01)

(58) Field of Classification Search
 None
 See application file for complete search history.

(56) References Cited

U.S. PATENT DOCUMENTS

| | | | |
|---|---|---|---|
| 9,306,965 B1* | 4/2016 | Grossman | H04L 63/1425 |
| 2016/0104163 A1 | 4/2016 | Aquino et al. | |
| 2016/0119364 A1* | 4/2016 | Zolli | G06Q 50/01 |
| | | | 726/26 |
| 2016/0358268 A1 | 12/2016 | Verma et al. | |
| 2018/0004948 A1* | 1/2018 | Martin | H04L 63/1425 |
| 2019/0228419 A1 | 7/2019 | Sampath | |
| 2020/0090059 A1 | 3/2020 | Kim et al. | |
| 2020/0344251 A1* | 10/2020 | Jeyakumar | G06F 16/951 |
| 2020/0380531 A1 | 12/2020 | Vaidya et al. | |
| 2022/0038490 A1* | 2/2022 | Thakur | G06N 3/0454 |
| 2022/0210079 A1* | 6/2022 | Koren | H04L 47/2441 |

\* cited by examiner

*Primary Examiner* — Alan Chen
(74) *Attorney, Agent, or Firm* — Weitzman Law Offices, LLC

(57) ABSTRACT

A system and method for using machine learning classifiers to auto-approve or auto-escalate unknown events is disclosed. The system has queues for receiving a stream of data concerning the unknown events; for storing data concerning escalated events believed to be adverse; and for storing data concerning approved events believed to be innocuous. When software instructions are executed, a device will retrieve data concerning an event from the first queue; vectorize and enrich the data; classify the vectorized, enriched data by a first machine learning model to decide whether to auto-escalate the data concerning the event to the second queue for review by a first human reviewer; and classify the vectorized, enriched data by a second machine learning model to decide whether to auto-approve the data concerning the event to the third queue.

20 Claims, 6 Drawing Sheets

RISK ASSESSMENT WITH AUTOMATED ESCALATION OR APPROVAL

FIELD OF INVENTION

This disclosure relates to systems and methods for machine learning systems to evaluate and prevent adverse events, and more specifically, to systems and methods involving machine learning models that apply a plurality of rules to a stream of input events to determine whether to automatically allow an input event to occur, automatically prevent an input event from occurring, or to escalate to a human reviewer.

BACKGROUND

There are numerous domains where a core problem involves evaluating a stream of input events, occurrences, or items, a fraction of which involve extreme risk if not properly evaluated and addressed. A mail system may want to evaluate whether each package sent may have a bomb, infectious agent, or other contraband. A network firewall may want to evaluate whether every network packet contains possible malware or represents part of a denial-of-service attack. A pharmacy may want to evaluate whether filling a particular prescription may lead to an adverse drug interaction or other danger to a patient. A person with food allergies may want to evaluate whether a given meal contains an allergen. Rather than rely exclusively on human review, any of these systems have a need to augment human analysis with an automated system that receives as input data regarding each event or item and acts based on the results of the analysis.

If an automated system approves of an adverse event (i.e., it produces a false negative), the results of that approval could be costly or even disastrous. However, if an automated system is too conservative and flags too many false positives to be reviewed by a human, the system would be of little benefit in reducing the workload of human reviewers. The problems of false negatives and false positives are exacerbated by the fact that many heuristics for identifying a danger require fuzzy logic-polymorphism might allow a computer virus to appear similar to, but not identical to, a known virus definition; there might be a misspelling in an ingredient list that might contain an allergen or a drug label that might cause an interaction.

Consequently, there are advantages to training an artificial intelligence system to better discriminate possible events or items into a "clearly adverse" classification or a "clearly innocuous" classification and that leaves as few events as possible in a middle category requiring human review.

SUMMARY OF THE INVENTION

A system for using machine learning classifiers to auto-approve or auto-escalate unknown events is disclosed. The system comprises a first queue for receiving a stream of data concerning the unknown events; a second queue for storing data concerning escalated events believed to be adverse; and a third queue for storing data concerning approved events believed to be innocuous. The system also comprises non-transitory memory storing instructions that, when executed by one or more processors, cause the one or more processors to perform a series of steps. The steps include retrieving data concerning an event from the first queue; vectorizing and enriching the data to conform to a format expected by a plurality of machine learning classifiers; and classifying the vectorized, enriched data by a first machine learning model and auto-escalate the data concerning the event to the second queue for review by a first human reviewer if and only if the first machine learning model concludes the event is adverse. If the first machine learning model does not conclude the event is adverse, the one or more processors classify the vectorized, enriched data by a second machine learning model and auto-approve the data concerning the event to the third queue if and only if the second machine learning model concludes the event is innocuous. If the second machine learning model does not conclude the event is innocuous, the one or more processors transmit the data concerning the event to a second human reviewer for review.

Similarly, a computer-implemented method for using machine learning classifiers to auto-approve or auto-escalate unknown events is disclosed. The method comprises retrieving data concerning an event from a first queue storing data concerning the unknown events; vectorizing and enriching the data to conform to a format expected by a plurality of machine learning classifiers; and classifying the vectorized, enriched data by a first machine learning model and auto-escalating the data concerning the event to a second queue for review by a first human reviewer if and only if the first machine learning model concludes the event is adverse. If the first machine learning model does not conclude the event is adverse, the method continues with classifying the vectorized, enriched data by a second machine learning model and auto-approving the data concerning the event to the third queue if and only if the second machine learning model concludes the event is innocuous. If the second machine learning model does not conclude the event is innocuous, the method continues with transmitting the data concerning the event to a second human reviewer for review.

Additional or more specific features include variations of the above system and method wherein:
- human reviewers review auto-escalated items as well as a random subset of auto-approved items, with the human reviewer's match or mismatch with a machine learning model's output is used to update training data for that machine learning model;
- the data is enriched by some or all of: adding to the data one or more measures of distance from text in data fields in the data to text in a heuristic for an adverse event; adding to the data an identification of a data field of a possible match with a heuristic for an adverse event, and a data type of that data field; adding to the data captured details related to the event; and/or adding to the data a plurality of extracted features for further natural language processing; and/or
- the multiple classifiers within each machine model are consulted, and an item is auto-escalated if any classifier is sufficiently confident that the item merits auto-escalation; and an item is auto-approved only if every classifier is sufficiently confident that the item merits auto-approval.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION

Figure 1:
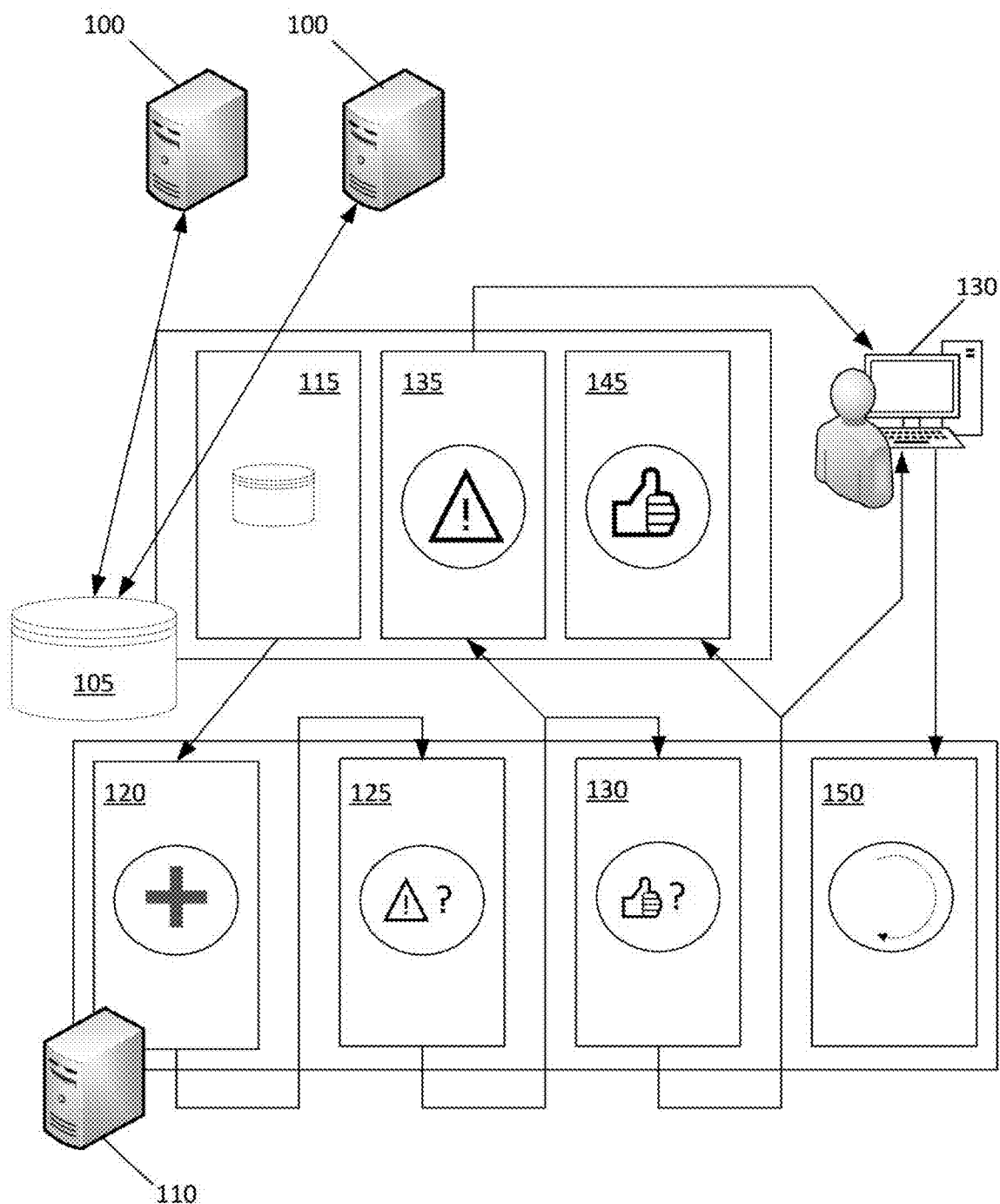
FIG. 1 illustrates, in simplified form, a system of computing devices used in receiving an input and deciding whether to auto-approve or auto-escalate the input to a human reviewer.

In order to address the prevalence of both false positives and false negatives in existing systems that use fuzzy logic to identify dangers or rule them out, a multi-model machine learning framework is described below.

The system auto-escalates the riskiest items to be immediately reviewed by a human subject matter expert, and auto-approves "facial false positives" with a very high level of accuracy. A facial false positive is any item that would initially trigger a simple substring search heuristic, but can be looked at by a human and immediately identified as innocuous without further analysis (for example, if a menu is being reviewed for possible nut allergens, and the item "doughnut" triggers a heuristic looking for the substring "nut"). An auto-approval machine learning model detects facial false positives with various degrees of confidence and avoids presenting such items to a human reviewer if the confidence is sufficiently high that it is a false positive.

Conversely, there may be situations with a facial false negative, where a misspelling or variation does not trigger a simple substring search (for example, if a menu item is labelled "contains tree nuts" and does not actually contain the substring "nut"). In such cases, an auto-escalation machine learning model detects the suspiciously high similarity between what would be a false negative and a known heuristic for danger, and if the confidence is sufficiently high, a human reviewer is presented with the item.

A stream of data representing input items is pre-processed and enriched in preparation for classification by both the auto-escalation ensemble model and the auto-approval ensemble model, as discussed in relation to FIGS. 2-5, below. The auto-escalation model is applied first to all inputs and sends potentially adverse items to a human reviewer to act upon in a timely manner. Items or situations that are not auto-escalated go through the auto-approval model to be closed out and ignored if any possible violations of rules or heuristics can be discarded as facial false positives. If neither the auto-escalation model nor the auto-approval model is sufficiently confident in a classification, a human reviewer makes the final judgment.

The central functionality of receiving a text string (or a database record comprising text) that represents an item and checking it for violation of any of a variety of constraints or heuristics that may indicate danger or an adverse event has potential application in a wide variety of contexts. A menu or ingredient list related to food may need to be checked on behalf of a person with a food allergy, substance intolerance (checking for presence of gluten, lactose, etc.), or religious/ideological dietary restriction (checking for presence of animal products, of meat, of specific meats, of non-kosher or non-halal foods, etc.). A pharmaceutical prescription or medical intervention plan may need to be checked for presence of a drug or other attribute that would have a harmful interaction or other effect on a patient. A proposed financial transaction may need to be checked to determine whether it violates the law because of international or personal sanctions imposed against the other participant in the transaction. In each of these cases, a system might auto-escalate an adverse situation to an appropriate subject matter expert (such as a doctor or banker), while ensuring that the situation is auto-approved if no cause for suspecting an adverse situation exists.

Although aspects of the below disclosure function especially well on text that is processed using natural language processing and other string-processing techniques adapted to text, the principles and general architecture could also be adapted to numeric information or to non-alphanumeric information that is quantifiable. For example, attributes of packet data transmitted over a network, such as IP address and number of bytes in a payload, might be checked to decide whether the packet is part of a distributed denial of service (DDOS) attack. Digital graphical information, such as a scan of a possible tumor, frame from a security camera, or image from a weather satellite, might be quantified and fed into a predictor of possible cancer, with situations being auto-escalated to an oncologist, security guard, or meteorologist, respectively. A request to make a credit card purchase might have location data or an amount of currency that suggests fraudulent use of a lost or stolen credit card, based on distance from the typical locations the card is used at, or the typical amounts of currency transferred. The current location, velocity, or other attributes of an airplane, ship, or other vehicle might suggest that a collision or other dangerous situation is imminent, and that a human driver may need to take over from an autopilot, or vice versa.

Throughout this written description, the generic term "item" is used to cover the wide variety of physical things, actual events, proposed or predicted events, or developing situations that might need to be classified as adverse, and in need of human intervention, or as innocuous, and safely to be ignored or permitted by an automated system.

FIG. 1 illustrates a system of computing devices used in receiving an input and deciding whether to auto-approve or auto-escalate the input to a human reviewer.

An organization or individual tasked with responding to a possible adverse item or event and with approving any items or events believed to be innocuous receives a stream of data concerning these events from one or more external sensors 100. These external sensors may be, depending on the application, network taps that are monitoring the contents of packets on a network, application programming interfaces (APIs) on a server receiving data transmitted over a network from a client software module or computing device, or any other means by which data might be received concerning attributes of a physical item or of an event that has happened or may happen imminently.

Regardless of how the data concerning events is obtained, it is stored in a database 105 to await processing by a server computing device or cluster of such devices 110. In a preferred embodiment, the storage of the database 105 is conceptually divided into at least three queues:

a first queue 115 for receiving data about items whose status is completely unknown, and from which items are removed, pre-processed by an enrichment module 120, and initially classified by the auto-escalating machine learning model 125 and auto-approving machine learning model 130 operated by the server/cluster 110;

a second queue 135 for receiving auto-escalated items and from which items are sent to a human reviewer using another computing device 140; and a third queue 145 for receiving auto-approved items and from which items are removed when the item is formally closed, archived, or deleted.

A feedback module 150 is preferably also included to continually store feedback regarding the auto-escalating machine learning model 125 and the auto-approving machine learning model 130 based on human confirmation or refutation of their outputs, as discussed further below in FIG. 2, and to re-train and refine the machine learning models based on the additional training data that a human confirmation or refutation represents. The frequency of re-training may depend on a number of factors, including the types of classifiers used and the computational cost of retraining, the rate of items being confirmed or refuted, and whether the classifying system is always active or has planned periods of downtime during which re-training does not affect performance in a production environment.

Although a particular division of functions between devices is described with relation to the systems depicted in FIG. 1, other configurations are possible in which functions are divided among devices differently. For example, all of the functions of some or all of the external sensors 100, database 105, server 110, and human reviewers' computing devices 140 may be performed by a single device with multiple threads executing different software modules simultaneously.

Alternatively, each of the database 105, server 110, and human reviewers' computing devices 140 may in fact be a cluster of computing devices sharing functionality for concurrent processing. The three queues 115, 135, 145 previously described might each be stored in separate databases, or the data enrichment module 120, two machine learning models 125, 130, and feedback module 150 might each be stored and operated by different servers. Although these various computing elements are described as if they are one computing device or cluster each, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme.

Figure 2:
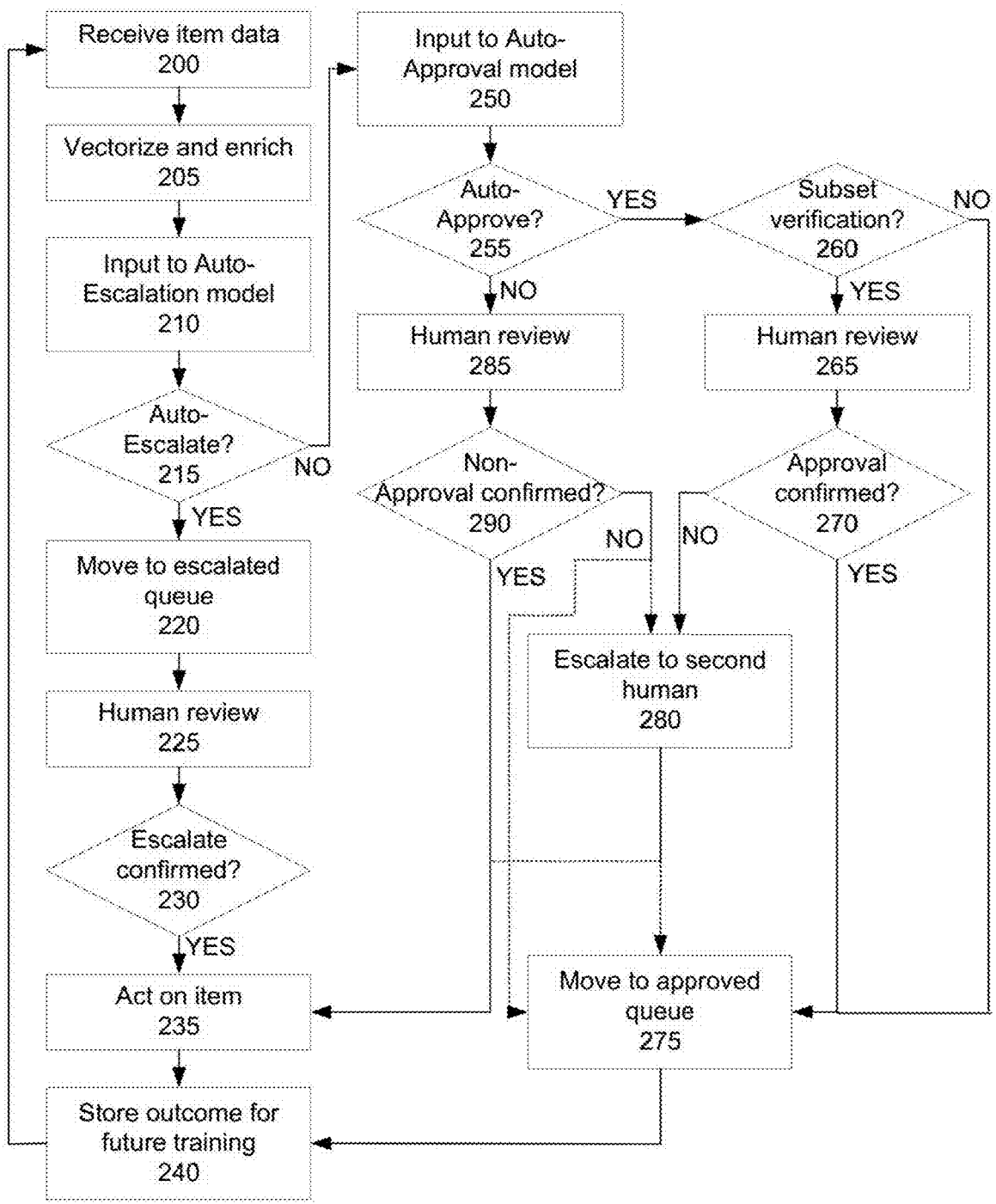
FIG. 2 illustrates, in simplified form, a high-level flow of processing each input, deciding whether to auto-approve or auto-escalate the input to a human reviewer, and using feedback from a human reviewer to refine machine learning models.

FIG. 2 illustrates, in simplified form, a high-level flow of processing each input and deciding whether to auto-approve or auto-escalate the input to a human reviewer, and using feedback from a human reviewer to refine machine learning models.

After data concerning an item is received from one of the external facing sensors 100 (Step 200), the data is enriched to make it more suitable for processing by machine learning models (Step 205). Various steps and options associated with that enrichment are discussed in greater detail below, in relation to FIG. 3. In short, the input data is transformed into an n-dimensional vector with additional dimensions added by the enrichment process, so that the vector can be more easily classified into a "clearly innocuous" or "clearly adverse" bucket by the multiple machine learning classification models.

The enriched data is first fed into the auto-escalating machine learning model (Step 210). Possible steps and options associated with this model are discussed in greater detail below, in relation to FIG. 4.

If the auto-escalating machine teaming model indicates that the item is to be auto-escalated (Step 215), or if a "safety net" described further below triggers on the item due to the presence of an entity absent in the training data, the item is moved to the second queue (Step 220). As soon as possible, the item is retrieved from the second queue and displayed to a human reviewer (Step 225). If the human reviewer confirms that the item should have been escalated and represents a real danger/violation (Step 230), the item is acted upon in accordance with that determination (Step 235). After acting to address the item, the human confirmation is recorded for future use in training and refining the auto-escalating machine learning model (Step 240). If the human reviewer instead contradicts the determination of the item's danger/violation, the item is moved to the approved queue (Step 245) and the human confirmation is recorded for future use in training and refining the auto-escalating machine learning model (Step 240).

If the auto-escalating machine learning model indicates that the item is not to be escalated, the item is next fed into the auto-approving machine learning model (Step 250). Possible steps and options associated with this model are discussed in greater detail below, in relation to FIG. 5.

If the auto-approving machine learning model indicates that the item is to be auto-approved (Step 255), the item will probably ultimately be moved to the third queue for closing or archiving. However, in a preferred embodiment, a subset of the auto-approved data first undergoes verification by a human reviewer. If the human reviewer indicates that an item should not have been approved, feedback is provided to avoid the auto-approving machine learning model becoming too liberal and continuing to approve adverse or borderline items. The subset may be determined randomly (such as, for every approved item, selecting it for subset verification with an independent 1% chance) or deterministically (such as selecting every 100$^{th}$ approved item, or selecting every item approved during the first minute of every hour).

If the item is selected for subset verification (Step 260), it is sent to a human reviewer for verification (Step 265). If the human reviewer confirms the approval (Step 270), the item is moved to the third queue (Step 275) and the human confirmation is recorded for future use in training and refining the auto-approving machine learning model (Step 240).

If the human reviewer contradicts the approval and indicates the item should have been escalated, the item is escalated to a higher level of human reviewer (Step 280) for a final decision. That final decision is recorded for future use in training and refining the auto-approving machine learning model (Step 240). The fact that the system had erroneously approved an adverse item is also reported to human decision makers or developers associated with the system in order to encourage them to develop finer heuristics to be applying to input data and avoid auto-approval in the future.

If the auto-approving machine learning model does not indicate that the item is to be auto-approved, it is sent to a human reviewer for classification (Step 285). If the human reviewer indicates the item should have been approved (Step 290), the mismatch may in some embodiments cause escalation to a higher level of human reviewer (Step 280) to act as tie-breaker, or in alternative embodiments may simply conclude that the item should be approved and sent to the third queue (Step 275). If the human reviewer confirms that the item should not have been approved, it must be acted on as a possible danger/violation (Step 235). The final decision is recorded for future use in training and refining the auto-approving machine learning model (Step 240).

The re-training of the auto-approving machine learning model (Step 240) may be complicated by the fact that an item may have multiple "hits" on heuristics or triggers that indicate an item to be potentially adverse. One or more of the classifiers used in the auto-approving machine learning model (such as a Distributed Random Forest, see below) may operate on a hit-by-hit basis instead of an item-by-item basis. As a result, the training data must be labelled as to whether each potential hit is a cause to refuse auto-approval, rather than whether the item as a whole should be auto-approved. Whenever a human reviewer corrects the decision of the auto-escalating machine learning model not to escalate or of the auto-approving machine learning model to approve, the human reviewer may not indicate which heuristic(s) had not been accurately applied by those machine learning models. For example, if the auto-approving model had approved a recipe containing "soy milk" and "buttermilk" for consumption by a dairy-intolerant person, a human reviewer would contradict that finding and reverse the approval, but the auto-approval machine learning model might not be informed regarding whether the soy milk or the buttermilk was the issue. Consequently, whenever there are multiple hits on an item that was erroneously auto-approved or erroneously failed to be auto-escalated, the auto-approval machine learning model preferably follows a conservative course and is retrained as if every hit had been reversed and should have been escalated. Similarly, if a most conservative approach is not needed, a human determination that an item should have been approved causes a retraining of the auto-approval machine learning model with the data annotated to indicate that every hit should still be responded to with an "approve" determination.

Once the item has been handled and feedback stored for re-training of and refinement to the machine learning models, the next item is received by the external sensors (back to Step 200).

Input Data Enrichment

Figure 3:
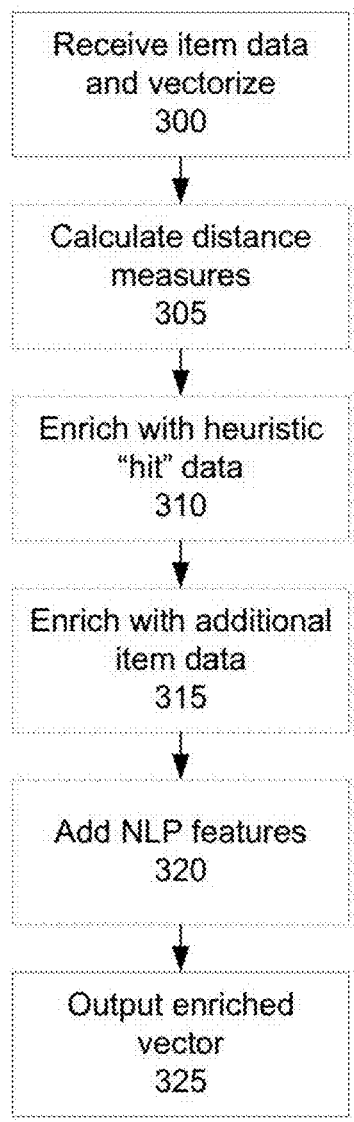
FIG. 3 illustrates, in simplified form, a method of transforming each input into a form more appropriate for machine learning analysis.

FIG. 3 illustrates, in simplified form, a method of transforming each input into a form more appropriate for machine learning analysis.

First, data regarding a possibly adverse item is received (Step 300). If it is not already in a vectorized format, it is stored as a vector by dividing the input data into a series of data fields that constitute it, or a series of words that make it up, or another model depending on the input data format and the context in which it will be used.

In many instances, it is possible that a single item has two or more "hits" or possible hits on the known heuristics associated with an item being adverse. For example, a person with dairy and nut allergies might want to view a recipe that contains "soy milk" and "coconut", both of which share a substring with a prohibited item. In these cases where a plurality of aspects of the item could each independently be adverse, the data enrichment may also involve creating one instance of the item for each hit and associating that instance with the hit. As a result, the classifiers described below would first classify in response to the query "Is this recipe dangerous because it contains soy milk?" and then independently classify in response to the query "Is this recipe dangerous because it contains coconut?", with different levels of confidence for each classifier on each hit. The resulting confidence values may then be used to determine an overall response based on how conservative or lax the system is intended to function, as described in greater detail below in relation to the auto-escalator and auto-approval models of FIGS. 4 and 5. In a preferred embodiment, the auto-escalation machine learning model may only classify the best hit out of all hits, when ranked by a distance measure to all hits (such as edit distance or cosine distance), rather than classifying every single possible hit.

There are multiple optional stages of enrichment, which may be performed in any order and in sequence or in parallel. In a preferred embodiment, all four of the stages below are performed and used to add features to a vectorized input.

First, the vector of data may be enriched by adding features with one or more measures of textual distance calculated between the data in the input and the heuristics or triggers associated with an item being adverse (Step 305). These may include, by way of non-limiting examples, the minimum among the Levenshtein distances or edit distances between each feature in the input and each heuristic being applied; a minimum angle among pairs of "bag of words" vectors representing each field in the input and each heuristic being applied, as determined by cosine similarity; and/or the maximum FuzzyWuzzy token set ratio measure among pairs of "bag of words" vectors representing each field in the input and each heuristic being applied. For each of these measures of distance, the particular heuristic or trigger that produced that smallest distance from the input might also be added to the vector. Ranking possible hits by similarity or distance from heuristic hits allows classifiers to make a classification decision based on the closest hit rather than classifying every single hit, if such a tradeoff of efficiency and conservatism is preferred.

Second, the vector of data may be enriched by adding features with more information regarding each heuristic or trigger that was a "hit" on the input data (Step 310). Examples might include which field of the input data was closest to a hit, what heuristic or trigger was a hit, and the data type/significance of the field that was a hit (e.g., a generic text field, an individual's name, an address, a date/timestamp, an IP address, a currency amount, etc.). Like the first enrichment described above, this enrichment may also result in the input item being associated with a plurality of hits that are classified independently, so that multiple classifications are performed when a classifier is operating on a hit-by-hit basis (as the DRF classifier does) rather than on an item-by-item basis (as the NLP classifier does).

Third, the vector of data may be enriched by adding features with more information regarding the item itself (Step 315). For example, if an item were a potentially sanctioned financial transaction and only contained a bank identifier and a bank account number, an external database might be consulted to add features such as the location of the bank and the owner of the account. If an item were a file potentially containing a dangerous computer virus, an IP address from which the file originated might allow an external lookup to see the location or organization with which that IP address is associated. Even if the added features do not directly trigger a heuristic known in advance, the feedback to machine learning models might allow the models to recognize a pattern before humans do and informally create a new heuristic they will be applying.

Fourth, the vector of data may also be enriched by adding extracted natural language processing (NLP) features (Step 320). Any text may be tokenized and converted to a "bag of words" vector model (where the vector has as many dimensions as words in the vocabulary, with a 1 indicating a particular word is present, and a 0 indicating that it is not). There may be refinements to remove irrelevant data, such as removal of stop words that don't carry semantically relevant information for the context (e.g., "the", "of", "a", "an", etc.); stemming (e.g., converting "buying". "buys", and "buyer" to "buy*" by stripping off all characters after a predefined stem), and lemmatizing (e.g., converting each of "buying", "bought". "would buy", "did buy" to the base form "buy"). Sets of consecutive n-grams among the tokens may be extracted and added as well. If data regarding the closest or most suspicious heuristics was gathered (Steps 305 or 310), additional textual values concatenating the heuristic and the data field that triggered it may be added as features as well.

Once any/all of the aforementioned steps have been performed, the resulting enriched vector of input data is output by the data enrichment module 120 (Step 325) and ready to be initially classified by the auto-escalating machine learning model 125.

The Auto-Escalation Model

Figure 4:
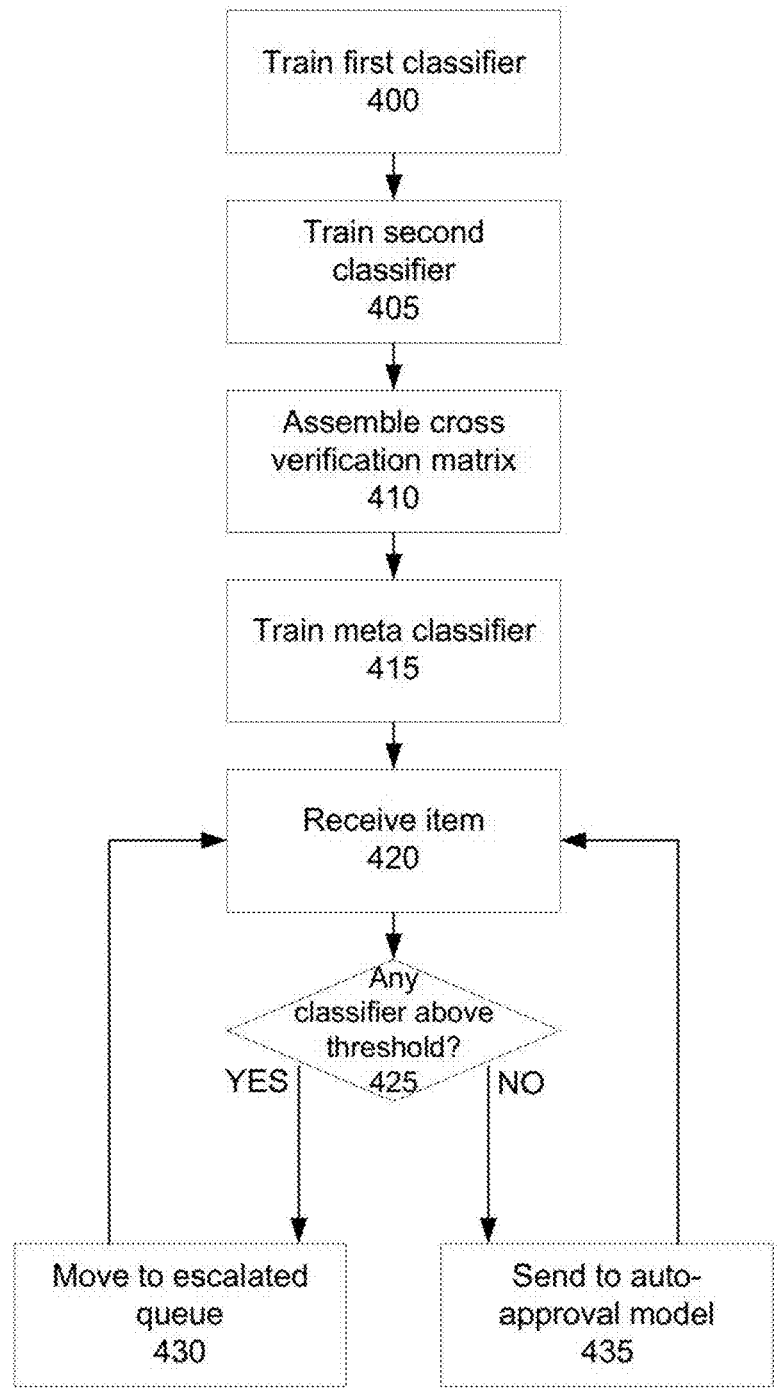
FIG. 4 illustrates, in simplified form, a method of using a stacked ensemble to decide whether to auto-escalate the input to a human reviewer.

FIG. 4 illustrates, in simplified form, a method of using a stacked ensemble to decide whether to auto-escalate the input to a human reviewer.

In a preferred embodiment, the auto-escalating machine learning model includes a stacked ensemble of two strong classifiers and a meta learner classifier.

First, a Distributed Random Forest (DRF), a bagging classifier that bags multiple random forests to generate a stronger model, is trained on a set of N pre-annotated enriched vectors to output an N-dimensional vector of likelihoods or confidences, from 0 to 1, that a given item of the N items is adverse (Step 400). In a preferred embodiment, 5-fold cross validation is performed as the classifier is trained, and the output of the validation is the confidence.

Second, and independently, the XGBoost boosting algorithm is applied to the same N pre-annotated enriched vectors to output another N-dimensional vector of likelihoods or confidences, from 0 to 1, that a given item of the N items is adverse (Step 405). In a preferred embodiment, 5-fold cross validation is performed as this classifier is trained, as well, to generate the confidences.

Next, the two vectors are combined into a 2×N matrix of the two classifiers' cross verification outputs (Step 410).

A Generalized Linear Model (GLM) acts as the meta-learning classifier and is trained using the 2×N matrix previously assembled (Step 415). For example, in a situation where the first classifier is only 30% sure that a given item is adverse, and the second classifier is likewise only 30% sure that the given item is adverse, the GLM might combine the two values in a manner that intuits that the true likelihood of the item being adverse is actually over 50%.

In other embodiments, more than two classifiers might be used, and the matrix size adjusted accordingly (3×N, 4×N, etc.) Different classifiers or meta-classifiers might be experimented with and work equally well; while DRF. XGBoost, and GLM are preferred, they are by no means exclusive or necessary ways of accomplishing classification. Different levels of k-fold cross validation may be used. Moreover, because the only cost of auto-escalation is that additional human attention is required that might otherwise be avoided, fewer than three classifiers might be used for the auto-escalating model.

For each future item to be classified (Step 420), the item's enriched vector is sequentially fed into a number of classifiers (Step 425). This number may be up to three in a preferred embodiment, with more classifiers being possible, and fewer also being possible if the sequence is short-circuited by the first or second classifier strongly recommending an escalation such that consulting the second or third classifier is unnecessary.

In a preferred embodiment, if any of the three classifiers returns a confidence value for escalation for any hit above a pre-determined threshold (Step 430), the overall model concludes escalation is necessary, given the overriding desire to avoid approving an adverse item. Thus, for example, if the first classifier has a 0.9 confidence in a need for escalation, the model might output "escalate" even if the second and third classifiers have much lower confidence. In alternative embodiments, the average of the classifiers' confidences might be used instead of the greatest among their values.

If all the confidences are sufficiently low (or their average is sufficiently low), the data is ultimately passed to the auto-approval model (Step 440), though in some embodiments, it optionally first passes through a "safety net" software process, as described in the following paragraphs.

An Auto-Escalating Safety Net

In some cases, either the auto-escalation or auto-approval classifiers may be trained on data that did not actually contain any examples of a particular danger being present. For example, human-known heuristics might indicate that two particular medications should never be prescribed to an individual simultaneously, or that "guacamole" should never be served to a person with an avocado allergy. However, it is possible that the auto-escalation and auto-approval classifiers would have been trained on data that happened not to include either example because of the relative rarity of those medications or that allergy. This danger might be particularly acute with some classifiers, such as Distributed Random Forest (where decision nodes are explicitly generated based on elements from training data) in comparison to others, such as Bayesian techniques (where it is possible to include a prior assumption about the danger of a never-before-seen input).

In order to avoid an item failing to auto-escalate or being auto-approved merely because it is novel, a data structure such as an array, map, or dictionary may be used to track the full set of entities that are known to be possibly relevant to a determination of an adverse event, associated with a flag, counter, or other indicator capable of showing whether the auto-escalation or auto-approval classifiers were trained on data that includes that entity.

If an item is not escalated by the initial classifiers, contains a relevant entity from the data structure, and the flag or counter shows that no training examples (or fewer training examples than a predetermined threshold) were used to train those classifiers, the item is auto-escalated to a human reviewer as if the initial classifiers had been triggered by it.

When the human reviewer either concurs with or contradicts the escalation determination, that item is added as an additional training example for the next routine training of the auto-escalation and auto-approval classifiers, and the data structure is likewise updated to indicate that the additional training example for that heuristic entity has been used.

The Auto-Approval Model

Figure 5:
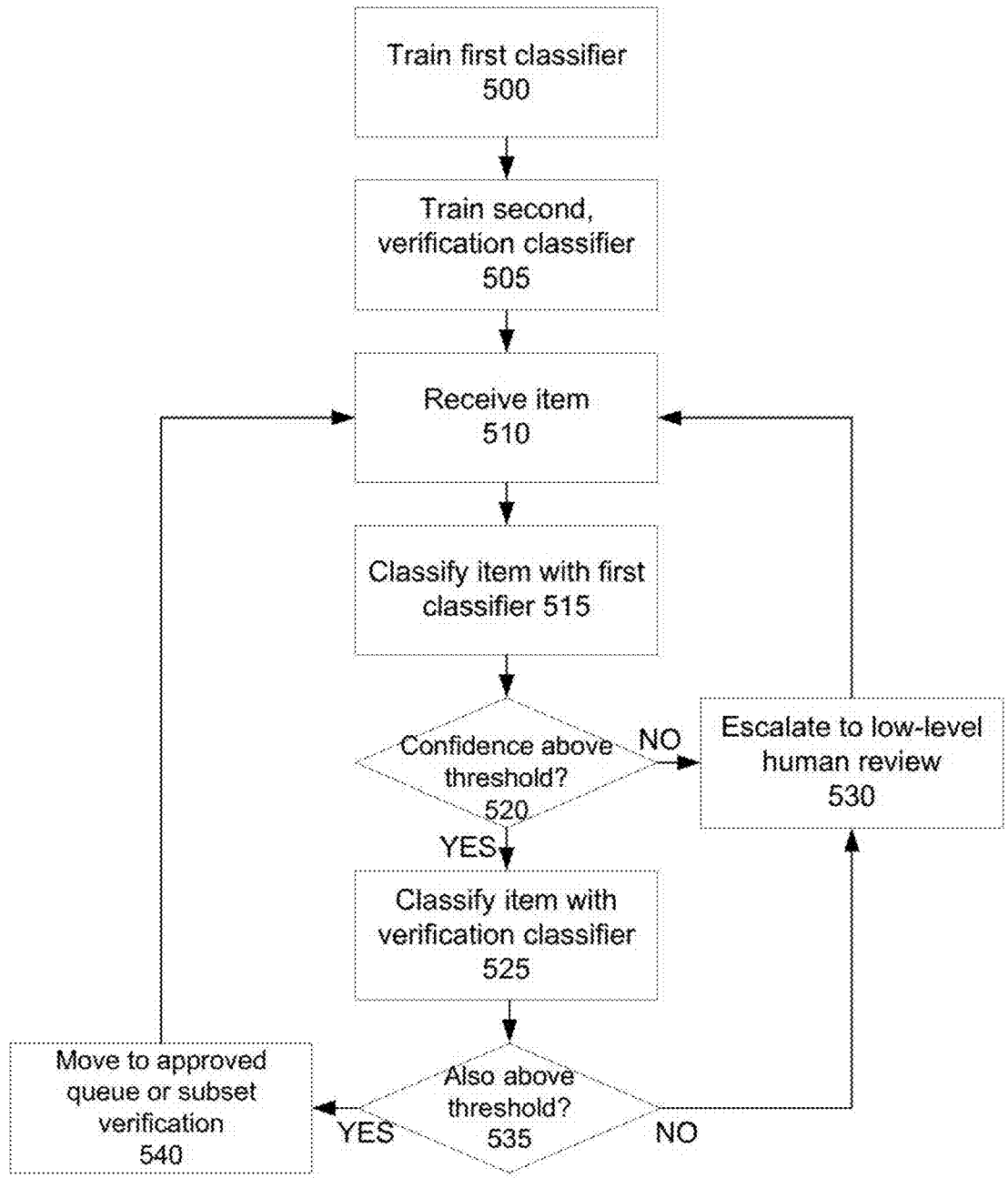
FIG. 5 illustrates, in simplified form, a method of using a stacked ensemble to decide whether to auto-approve an input.

FIG. 5 illustrates, in simplified form, a method of using a stacked ensemble to decide whether to auto-approve an input.

The auto-approval model receives all data that is not auto-escalated, and is more important in the scheme of reducing false negatives that might allow adverse items to affect humans or organizations. In a preferred embodiment, an initial classifier is used, and followed by another classifier with different cognitive bias and different feature nature to verify the results of the previous classifier.

The initial classifier to be trained (Step 500) is, in a preferred embodiment, a decision tree-based classifier such as DRF.

Next, the verification classifier is trained (Step 505). In a preferred embodiment, an NLP classifier that acts upon extracted text features or heuristic hits (see Steps 310,320 in FIG. 3) is used, so that it is fundamentally operating on different extracted textual or heuristic features, instead of the basic "bag of words" model. As a result, both classifiers will be looking at all hits and their details from two different perspectives.

Examples of NLP classifiers that might be preferred, depending on the context of the classification, include Naïve Bayes classifiers (including Bernoulli Naïve Bayes, Multivariate Bernoulli Naïve Bayes, and multinomial Naïve Bayes) especially in the fields of text or document classification and disease prediction. However, for messaging and shorter texts, the Bernoulli Naïve classifier is preferred. Maximum entropy classifiers are also very strong text classification classifiers. Limited memory Broyden-Fletcher-Coldfarb-Shanno (L-BFGS) and quasi-Newton method can be used to solve the optimization problem finding the optimal weights. The L-BFGS quasi-Newton method, as part of the Quasi-Newton family, is considered as one of the most efficient optimization methods for maximum entropy classifiers. Furthermore, early stopping with a small epsilon and L2 regularization (also known as a Gaussian prior) with sigma=1 can be applied to prevent long training and reduce overfitting.

When an item is received for auto-approval (Step 510), the item (or its closest hit, for a hit-based classifier) is classified by the first classifier (Step 515). In situations where an item may have a plurality of hits to be classified independently (see Steps 305 and 310, in FIG. 3, above), the classifier will assign a confidence level to each hit, rather than to the item as a whole. If a set of hits are being classified, an overall confidence level may be calculated, either as a linear combination of the hits' confidences (such as their average) or another statistical quality of their confidences (such as maximum, minimum, or median). In some embodiments, a more conservative calculation such as the minimum might be preferred, while in others, a laxer average might be preferred.

Only if the item/set of hits is approved by the first classifier with sufficient confidence above a predefined threshold (Step 520) is the item passed on to the verification classifier (Step 525). Unlike the first stage of classification, which preferably classifies on a hit-by-bit basis, the second, verification classifier preferably classifies the item as a whole based on NLP analysis of the item. If the confidence in approval is insufficient, the item is instead escalated to a first tier of human review (Step 530) to determine if it can be facially approved or acted upon.

If the verification classifier likewise approves with sufficient confidence above a predefined threshold (Step 535), the item is moved into a queue for approval, closing, archiving, and/or deletion, or, in a preferred embodiment, may first be sent for subset verification as previously described. If the verification classifier is insufficiently confident that the item should be approved, it will be added to the same queue for human review (Step 530) as those which did not satisfy the first classifier. In alternative embodiments, the sequential classification might be replaced by parallel classification with multiple classifiers, with an overall confidence level being determined based on the average of confidences of classifiers, or on any other linear combination or other function of the classifiers' output confidences. Regardless of the means used to come to a final confidence level, that confidence can be compared to a predetermined threshold required to auto-approve an item (calibrated appropriately in light of the consequences of a false negative approval of a dangerous item) and the item will ultimately be escalated to a human reviewer if the classifiers and any meta-classifier deciding based on their output fail to meet the threshold.

Computing Devices Generally

Although FIG. 1 depicts a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 6, below, describes various enabling devices and technologies related to the physical components and architectures described above.

Figure 6:
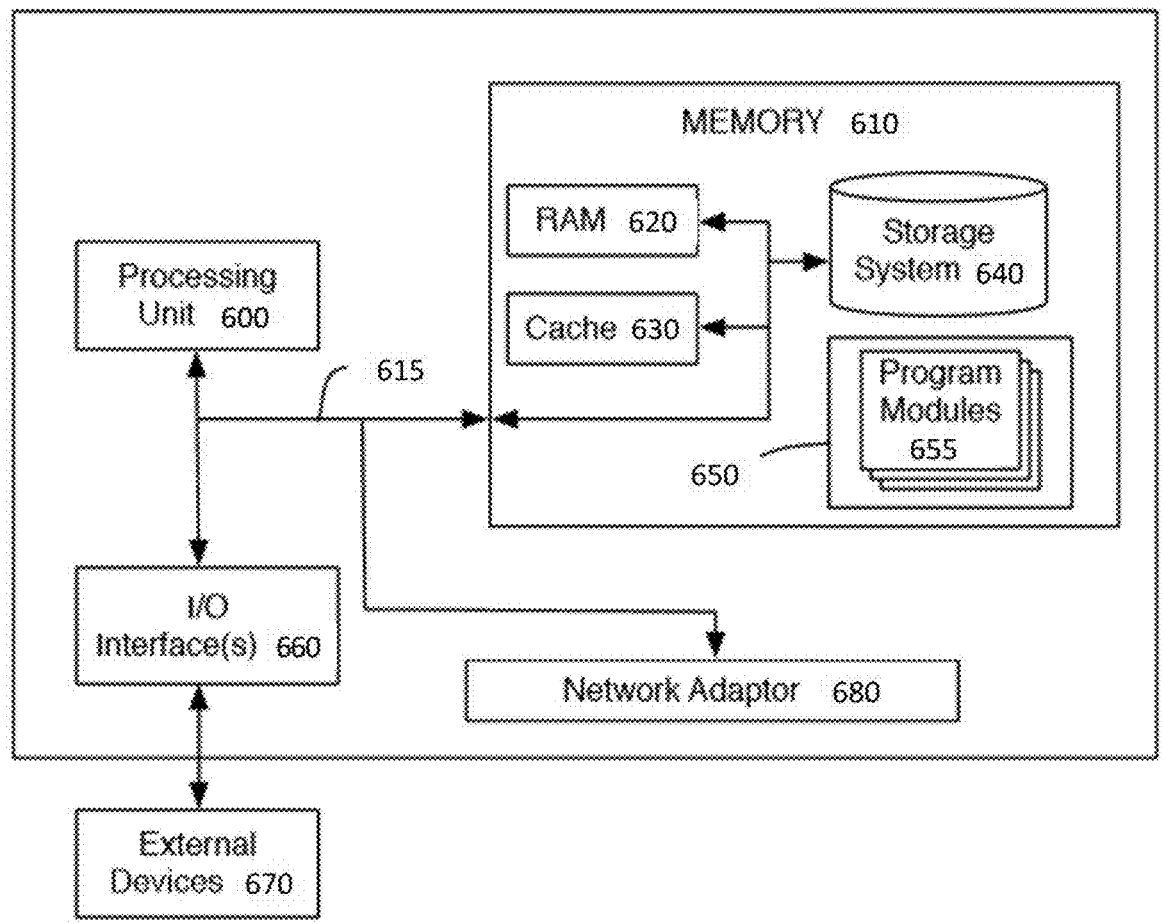
FIG. 6 is a high-level block diagram of a representative computing device that may be utilized to implement various features and processes described herein.

FIG. 6 is a high-level block diagram of a representative computing device that may be utilized to implement various features and processes described herein, for example, the functionality of the external sensors 100, database 105, server/cluster 110, and human reviewers' computing devices 140, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 6, the computing device is illustrated in the form of a special purpose computer system. The components of the computing device may include (but are not limited to) one or more processors or processing units 600, a system memory 610, and a bus 615 that couples various system components including memory 610 to processor 600.

Bus 615 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 600 may execute computer programs stored in memory 610. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 600 may be used.

The computing device typically includes a variety of computer system readable media. Such media may be any available media that is accessible by the computing device, and it includes both volatile and non-volatile media, removable and non-removable media.

System memory 610 can include computer system readable media in the form of volatile memory, such as random access memory (RAM) 620 and/or cache memory 630. The computing device may further include other removable/non-removable, volatile/non-volatile computer system storage media. By way of example only, storage system 640 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 615 by one or more data media interfaces. As will be further depicted and described below, memory 610 may include at least one program product having a set (e.g., at least one) of program modules that are configured to carry out the functions of embodiments described in this disclosure.

Program/utility 650, having a set (at least one) of program modules 655, may be stored in memory 610 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 670 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 660.

In addition, as described above, the computing device can communicate with one or more networks, such as a local area network (LAN), a general wide area network (WAN) and/or a public network (e.g., the Internet) via network adaptor 680. As depicted, network adaptor 680 communicates with other components of the computing device via bus 615. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for using machine learning classifiers to auto-approve or auto-escalate unknown events, comprising:
   a first queue for receiving a stream of data concerning the unknown events;
   a second queue for storing data concerning escalated events believed to be adverse;
   a third queue for storing data concerning approved events believed to be innocuous; and
   non-transitory memory comprising instructions that, when executed by one or more processors, cause the one or more processors to:
   retrieve data concerning an event from the first queue;
   vectorize and enrich the data to conform to a format expected by a plurality of machine learning classifiers;
   classify the vectorized, enriched data by a first machine learning model and auto-escalate the data concerning the event to the second queue for review by a first human reviewer if and only if the first machine learning model concludes the event is adverse;
   if the first machine learning model does not conclude the event is adverse, classify the vectorized, enriched data by a second machine learning model and auto-approve the data concerning the event to the third queue if and only if the second machine learning model concludes the event is innocuous; and
   if the second machine learning model does not conclude the event is innocuous, transmit the data concerning the event to a second human reviewer for review.

2. The system of claim 1, wherein the instructions, when executed by one or more processors, further cause the one or more processors to:
   after the second machine learning model did not conclude the event is innocuous, receive from the second human reviewer a communication indicating that the second machine learning model should have concluded the event is innocuous; and
   update training data for the second machine learning model based on a mismatch between the received communication and lack of conclusion of the second machine learning model that the event is innocuous.

3. The system of claim 1, wherein the instructions, when executed by one or more processors, further cause the one or more processors to:
   after the second machine learning model does conclude the event is innocuous, select the event for further review by the second human reviewer;
   receive from the second human reviewer a communication indicating that the second machine learning model should not have concluded the event is innocuous; and
   update training data for the second machine learning model based on a mismatch between the received communication and conclusion of the second machine learning model that the event is innocuous.

4. The system of claim 3, wherein the selection of the event for further review is random rather than based on any quality or value of the data concerning the event.

5. The system of claim 1, wherein the instructions, when executed by one or more processors, further cause the one or more processors to:
   after the second machine learning model does conclude the event is innocuous, select the event for further review by the second human reviewer;
   receive from the second human reviewer a communication indicating that the second machine learning model correctly concluded the event is innocuous; and
   update training data for the second machine learning model based on a match between the received communication and conclusion of the second machine learning model that the event is innocuous.

6. The system of claim 1, wherein the enriching comprises at least two of:
   adding to the data one or more measures of distance from text in data fields in the data to text in a heuristic for an adverse event;
   adding to the data an identification of a data field of a possible match with a heuristic for an adverse event, and a data type of that data field;
   adding to the data captured details related to the event; and/or
   adding to the data a plurality of extracted features for further natural language processing.

7. The system of claim 1, wherein the first machine learning model checks the vectorized, enriched data for a plurality of possible classifications associated with the event being adverse, each classification being given a confidence value, and the data concerning the event is auto-escalated to the second queue if any adverse classification has a confidence value greater than a predefined threshold.

8. The system of claim 1, wherein the second machine learning model checks the vectorized, enriched data for a plurality of possible classifications associated with the event being adverse, each classification being given a confidence value, and the data concerning the event is auto-approved to the third queue only if every adverse classification has a confidence value lower than a predefined threshold.

9. The system of claim 1, wherein the second machine learning model comprises at least two stages, and wherein a second stage of the second machine learning model is performed as a verification if and only if a first stage approves of an item.

10. The system of claim 1, wherein, after the first machine learning model does not conclude the event is adverse, but prior to classification of the vectorized, enriched data by a second machine learning model, a safety net classifier confirms that training data for the first machine learning model and the second machine learning model included training examples having a same entity from a heuristic for adverse events that the event not concluded to be adverse by the first machine learning model had.

11. A computer-implemented method for using machine learning classifiers to auto-approve or auto-escalate unknown events, comprising:
   retrieving data concerning an event from a first queue storing data concerning the unknown events;
   vectorizing and enriching the data to conform to a format expected by a plurality of machine learning classifiers;
   classifying the vectorized, enriched data by a first machine learning model and auto-escalating the data concerning the event to a second queue for review by a first human reviewer if and only if the first machine learning model concludes the event is adverse;
   if the first machine learning model does not conclude the event is adverse, classifying the vectorized, enriched data by a second machine learning model and auto-approving the data concerning the event to the third queue if and only if the second machine learning model concludes the event is innocuous; and
   if the second machine learning model does not conclude the event is innocuous, transmitting the data concerning the event to a second human reviewer for review.

12. The method of claim 11, further comprising:
   after the second machine learning model did not conclude the event is innocuous, receiving from the second human reviewer a communication indicating that the second machine learning model should have concluded the event is innocuous; and
   updating training data for the second machine learning model based on a mismatch between the received communication and lack of conclusion of the second machine learning model that the event is innocuous.

13. The method of claim 11, further comprising:
   after the second machine learning model does conclude the event is innocuous, select the event for further review by the second human reviewer;
   receiving from the second human reviewer a communication indicating that the second machine learning model should not have concluded the event is innocuous; and
   updating training data for the second machine learning model based on a mismatch between the received communication and conclusion of the second machine learning model that the event is innocuous.

14. The method of claim 13, wherein the selection of the event for further review is random rather than based on any quality or value of the data concerning the event.

15. The method of claim 11, further comprising:
   after the second machine learning model does conclude the event is innocuous, selecting the event for further review by the second human reviewer;
   receiving from the second human reviewer a communication indicating that the second machine learning model correctly concluded the event is innocuous; and
   updating training data for the second machine learning model based on a match between the received communication and conclusion of the second machine learning model that the event is innocuous.

16. The method of claim 11, wherein the enriching comprises at least two of:
   adding to the data one or more measures of distance from text in data fields in the data to text in a heuristic for an adverse event;
   adding to the data an identification of a data field of a possible match with a heuristic for an adverse event, and a data type of that data field;
   adding to the data captured details related to the event; and/or
   adding to the data a plurality of extracted features for further natural language processing.

17. The method of claim 11, wherein the first machine learning model checks the vectorized, enriched data for a plurality of possible classifications associated with the event being adverse, each classification being given a confidence value, and the data concerning the event is auto-escalated to the second queue if any adverse classification has a confidence value greater than a predefined threshold.

18. The method of claim 11, wherein the second machine learning model checks the vectorized, enriched data for a plurality of possible classifications associated with the event being adverse, each classification being given a confidence value, and the data concerning the event is auto-approved to the third queue only if every adverse classification has a confidence value lower than a predefined threshold.

19. The method of claim 11, wherein the second machine learning model comprises at least two stages, and wherein a second stage of the second machine learning model is performed as a verification if and only if a first stage approves of an item.

20. The method of claim 11, wherein, after the first machine learning model does not conclude the event is adverse, but prior to classification of the vectorized, enriched data by a second machine learning model, a safety net classifier confirms that training data for the first machine learning model and the second machine learning model included training examples having a same entity from a heuristic for adverse events that the event not concluded to be adverse by the first machine learning model had.

* * * * *